(12) United States Patent
Baity et al.

(10) Patent No.: US 11,919,630 B2
(45) Date of Patent: Mar. 5, 2024

(54) SEPARATED LIFT-THRUST VTOL AIRCRAFT WITH ARTICULATED ROTORS

(71) Applicant: Textron Systems Corporation, Hunt Valley, MD (US)

(72) Inventors: Sean Marshall Baity, Westminster, MD (US); Stephen W. Miller, Perry Hall, MD (US)

(73) Assignee: Textron Systems Corporation, Hunt Valley, MD (US)

( * ) Notice: Subject to any disclaimer, the term of this patent is extended or adjusted under 35 U.S.C. 154(b) by 100 days.

(21) Appl. No.: 16/993,516

(22) Filed: Aug. 14, 2020

(65) Prior Publication Data

US 2021/0107640 A1 Apr. 15, 2021

Related U.S. Application Data

(60) Provisional application No. 62/887,764, filed on Aug. 16, 2019.

(51) Int. Cl.
*B64C 29/00* (2006.01)

(52) U.S. Cl.
CPC ................. *B64C 29/0033* (2013.01)

(58) Field of Classification Search
CPC .................................................. B64C 29/0033
See application file for complete search history.

(56) References Cited

U.S. PATENT DOCUMENTS

| 6,561,456 | B1 * | 5/2003 | Devine ............... B64C 29/0025 |
| | | | 244/12.3 |
| 8,636,241 | B2 | 1/2014 | Lugg et al. |
| 10,450,062 | B1 * | 10/2019 | Bova ..................... B64C 39/024 |
| 10,562,623 | B1 * | 2/2020 | Sloan ....................... B64C 13/18 |
| 11,485,488 | B1 * | 11/2022 | Armer .................... B64C 17/00 |
| 2009/0008499 | A1 | 1/2009 | Shaw |

(Continued)

FOREIGN PATENT DOCUMENTS

| DE | 102014000640 A1 | 7/2015 |
| EP | 2802952 | 11/2014 |

(Continued)

*Primary Examiner* — Tien Q Dinh
*Assistant Examiner* — William L Gmoser
(74) *Attorney, Agent, or Firm* — BainwoodHuang

(57) ABSTRACT

A separated lift-thrust (SLT) aircraft includes a longitudinal-thrust engine and articulated electric rotors, at least some of which are variable-position rotors having variable orientations based on rotor position signals. Control circuitry independently controls thrust of the longitudinal-thrust engine and the thrust and orientation of each of the variable-position rotors, relative to the aircraft lifting surface and longitudinal thrust engine, to provide for commanded thrust-vectoring maneuvering of the aircraft during VTOL, fixed wing flight, and intermediate transitional states, including maintenance of a desired pose of the lifting surface independent of orientation of the rotor orientations when hovering the aircraft in windy conditions. A flight and navigation control system automates flight maneuvers and maintains desired aircraft pose and position relative to static or dynamic coordinates during station keeping, tracking, avoidance, or convergence maneuvers.

13 Claims, 16 Drawing Sheets

(56) References Cited

U.S. PATENT DOCUMENTS

| | | |
|---|---|---|
| 2011/0031355 A1 | 2/2011 | Alvarez Calderon F |
| 2012/0280091 A1 | 11/2012 | Saiz |
| 2015/0014475 A1* | 1/2015 | Taylor ................. B64C 29/0025 244/6 |
| 2017/0240273 A1 | 8/2017 | Yuen |
| 2018/0229837 A1* | 8/2018 | Kimchi ................. B64C 39/024 |
| 2018/0265191 A1 | 9/2018 | Sakuma |
| 2019/0152593 A1* | 5/2019 | Castellano Aldave ..................... B64C 29/0033 |
| 2019/0291860 A1 | 9/2019 | Morgan |
| 2019/0329882 A1* | 10/2019 | Baity ....................... B64C 27/26 |
| 2020/0164972 A1* | 5/2020 | Kiesewetter ............ B64C 27/20 |
| 2021/0206487 A1* | 7/2021 | Iqbal .................. B64C 29/0083 |

FOREIGN PATENT DOCUMENTS

| | | |
|---|---|---|
| KR | 101895366 | 9/2018 |
| WO | 2018163156 | 9/2018 |
| WO | 2019090046 | 5/2019 |
| WO | WO-2019212439 A2 * | 11/2019 |

* cited by examiner

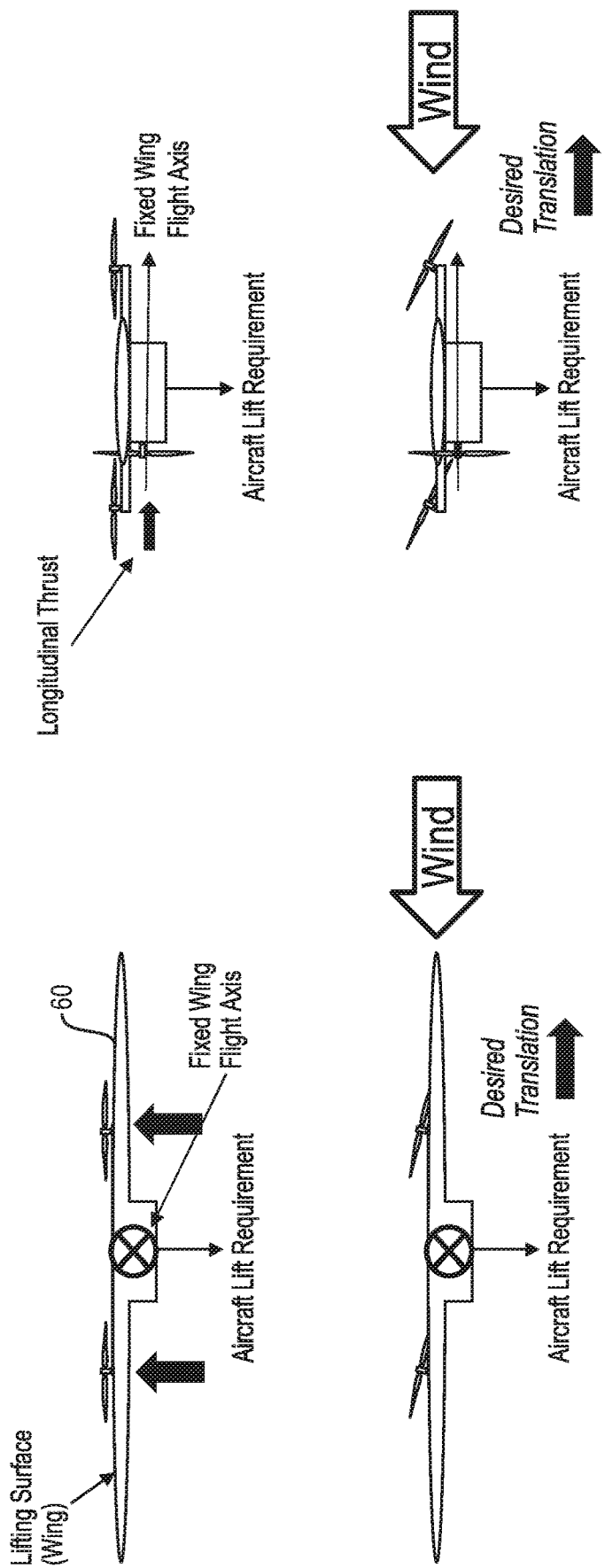

Variable Position Rear Pod
Variable Position Front Pod
Fixed Longitudinal Engine Semi-Fixed Position Rear Pod
Variable Position Front Pod
Fixed Longitudinal Engine Fixed Position Rear Pod
Variable Position Front Pod
Fixed Longitudinal Engine

SEPARATED LIFT-THRUST VTOL AIRCRAFT WITH ARTICULATED ROTORS

BACKGROUND

The invention is generally in the field of aircraft propulsion, and more specifically it relates to vertical takeoff and landing (VTOL) capable, separated lift-thrust, fixed-wing aircraft.

SUMMARY

Known separated lift-thrust VTOL capable fixed wing aircraft depend on a longitudinal thrust engine/motor to maneuver during VTOL operations. The ability of the system to effectively maneuver is limited by the ability of the aircraft to maintain the pose, or orientation, of the lifting surface (wing). Typical thrust engines provide limited longitudinal thrust in VTOL operation, and the more power dense VTOL lifting systems cannot be leveraged during maneuvers while the lifting wing is not aerodynamically viable. As a result, separated lift-thrust systems are sluggish in VTOL maneuver compared to traditional multi-rotor systems, requiring additional onboard stored energy and greater egress/ingress footprint/volume, and they can be limited by environmental conditions to execute precision relative position control and convergence to static and dynamic targets.

More specifically, fixed wing surfaces can be a severe detriment to aircraft maneuver control when such a hybrid type aircraft is operating in VTOL mode. A typical quad rotor uses platform pitch and roll to generate side force to resist winds and create the ability to rotate and translate. If such an approach were to be used for a quad rotor with large appendages, such as wings, the wind would interact with the wings to generate horizontal and vertical forces that compete and can potentially overwhelm the VTOL control capability. As a result, a VTOL with wings must limit pitch and roll angles in windy conditions to maintain controlled flight, which can significantly limit aircraft maneuvering in such conditions.

Disclosed is a vertical takeoff and landing (VTOL) capable, separated lift-thrust, fixed-wing aircraft in which dynamic pose and relative position are managed using vectored thrust propulsion from articulated rotors. By utilizing articulated lifting rotor assemblies, the aircraft can leverage additional thrust control to manage the pose of the aircraft while maneuvering. More specifically, the ability to independently generate longitudinal and lateral forces with the VTOL system while holding wings level is an important capability of the disclosed aircraft. Lifting rotor assemblies are actuated around one or more axes of rotation to independently control respective rotors to work in conjunction with the longitudinal thrust engine/motor to provide resultant maneuver vector while actively managing flight profile and aircraft pose.

Generally, the disclosed aircraft includes:
an airframe having a lifting surface;
one or more longitudinal-thrust engine(s) (generally inclusive of an internal combustion engine(s) or electrical motor(s)/propeller(s);
a plurality of modular articulated electric rotors attached to the airframe, at least some of the rotors being variable-position rotors having variable orientations based on rotor position signals supplied thereto;
a source of electrical power for powering the electric rotors;
control circuitry configured and operative to independently control thrust of the longitudinal-thrust engine and rotor thrust and rotor orientation of each of the variable-position rotors, relative to the aircraft lifting surface and longitudinal thrust engine, to provide for commanded thrust-vectoring maneuvering of the aircraft during VTOL, fixed wing flight, and intermediate transitional states, including maintenance of a desired pose of the lifting surface independent of orientation of the rotor orientations when hovering the aircraft in windy conditions; and
a flight and navigation control system that automates flight maneuvers autonomously or through human-in-the-loop augmentation and is capable of maintaining the desired aircraft system pose and position relative to static or dynamic global coordinates that are autonomously or operator defined when the aircraft is executing station keeping, tracking, avoidance, or convergence maneuvers.

In accordance with some embodiments, each modular articulated electric rotor includes a propeller, a motor constructed and arranged to rotate that propeller, and a vector control assembly (e.g., a set of actuators or servos) coupled with the motor. The vector control assembly receives control signals from the control circuitry to control the angular displacement or tilt of the motor relative to the airframe.

During operation, the aircraft (e.g., an unmanned aerial vehicle or UAV) may fly horizontally in response to propulsion from the set of longitudinal-thrust engines and lift provided by the lifting surface of the airframe (e.g., a set of fixed wings). While in horizontal flight, one or more of the modular articulated electric rotors may contribute by providing vectored thrust having a horizontal component (e.g., due to angular displacement of the motor axis). Alternatively, one or more of the modular articulated electric rotor may not provide thrust (e.g., to conserve power).

Additionally, the aircraft may perform hovering maneuvers in response to lift provided by one or more of the modular articulated electric rotors. Here, the longitudinal-thrust engine(s) may provide little or no propulsion. Rather, the modular articulated electric rotors provide vectored thrust having a significant vertical component to sustain the aircraft in the desired hovering position(s).

Moreover, during such hovering maneuvers, each modular articulated electric rotor may articulate independently in response to the control signals from the control circuitry to provide effective and efficient positioning control (e.g., pitch, roll, yaw, other station-keeping maneuvering, etc.). For example, a first subset of the modular articulated electric rotors may aim slightly toward the wind direction while another second subset of the modular articulated electric rotors remain substantially vertical (perpendicular to the airframe) to sustain the aircraft in a level hovering position. If desired, the aircraft can maintain a level hovering position even in a dynamically changing wind environment such as a situation of strong but varying headwinds.

During such operation, the set of longitudinal-thrust engines may provide propulsion to provide additional position control and/or maneuvering. For example, with propulsion from the set of longitudinal-thrust engines, the aircraft may perform gradually scanning or creeping maneuvers, weathervane maneuvers (e.g., pointing the nose or other aircraft component into the wind), takeoff/landing maneuvers, and so on.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

FIGS. 4A and 4B are schematic illustrations of hovering operation of the aircraft of FIG. 3;

DETAILED DESCRIPTION

Figure 1:
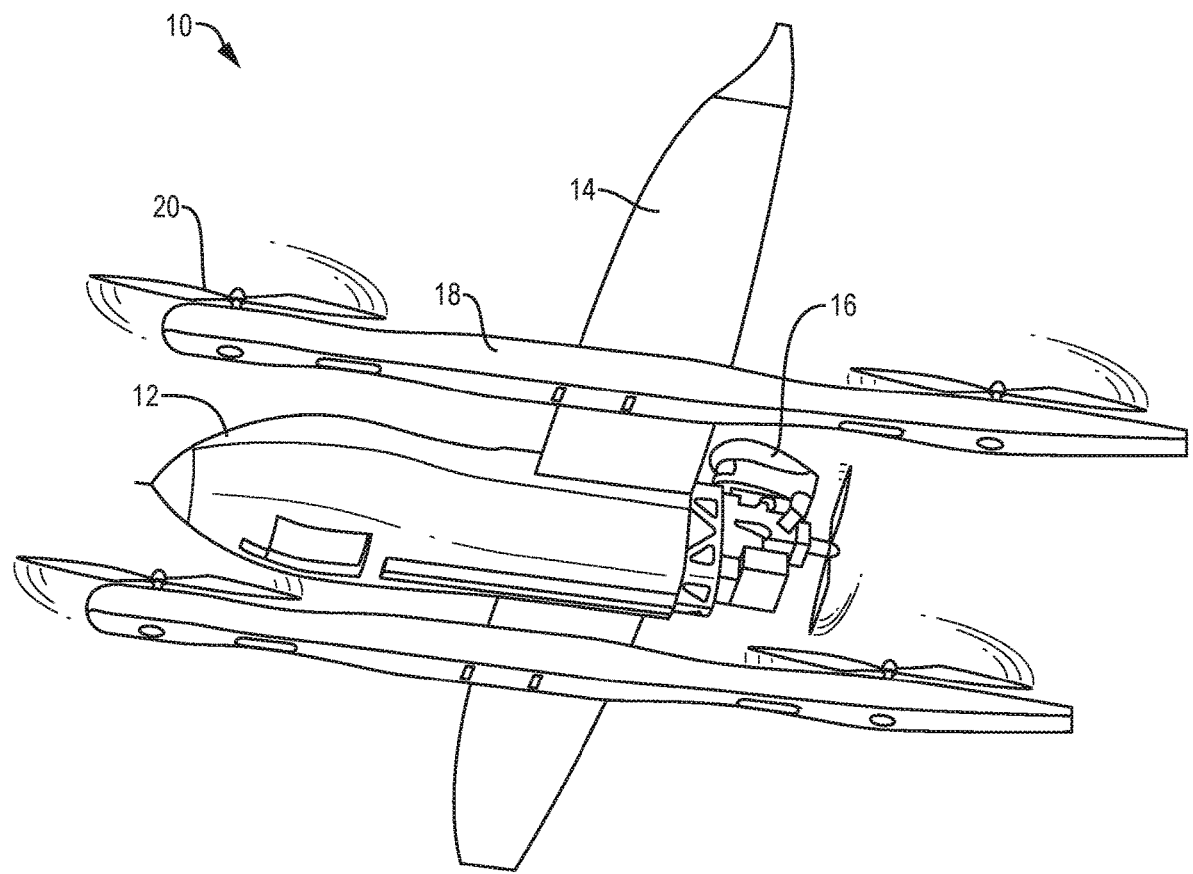
FIG. 1 is an isometric view of a VTOL aircraft as known in the art.

FIG. 1 shows an unmanned aircraft system (UAS) 10, also referred to as an unmanned aerial vehicle (UAV), having a known arrangement. The basic structure is that of a fixed-wing aircraft having an elongated fuselage 12 and fixed wings 14, with horizontal propulsion provided by a rear-mounted engine and propeller 16. The UAS 10 is also configured for vertical takeoff and landing (VTOL) through the use of booms 18, each attached to the underside of a respective wing 14 and carrying respective fixed-orientation, upward-facing propellers 20. The propellers 20 are powered by respective small engines or motors within the booms 18, not visible in this view. With the addition of VTOL structure and capability as described, the UAS 10 may be referred to as a "hybrid" UAS 10.

In operation, the UAS 10 is launched vertically, typically from a ground position, then flown in a conventional fixed-wing manner, and may be landed vertically as well. During launch and landing the propellers 20 are used to provide vertical thrust, while the rear-mounted engine and propeller 16 are either active or at idle. During fixed-wing flight, the rear-mounted engine and propeller 16 provide horizontal thrust, and the VTOL propellers 20 are generally idle. Although the booms 18 represent undesirable weight and drag for fixed-wing flight, there are applications in which this drawback is outweighed by the desired VTOL capability. In one embodiment, the booms 18 are of identical construction notwithstanding that they are used on opposite sides of the UAS 10. Left/right dependencies may be accommodated by use of adaptors as necessary, for example to connect to the V-shaped tail.

In some dynamic environments there may be significant limitations to performance of a hybrid UAV such as the aircraft 10 shown in FIG. 1. Fixed wing aircraft employing fixed orientation, separated lift and thrust multi-rotor lift solutions (e.g., hybrid quad), must constrain aircraft pose and have limitations on maneuver rates during hover-translations operations. Constraints are necessary to prevent adverse aerodynamic effects arising from presenting fixed wing lifting surfaces (wings, tails, etc.) to ambient free stream airflow (i.e. wind).

Figures 2A, 2B:
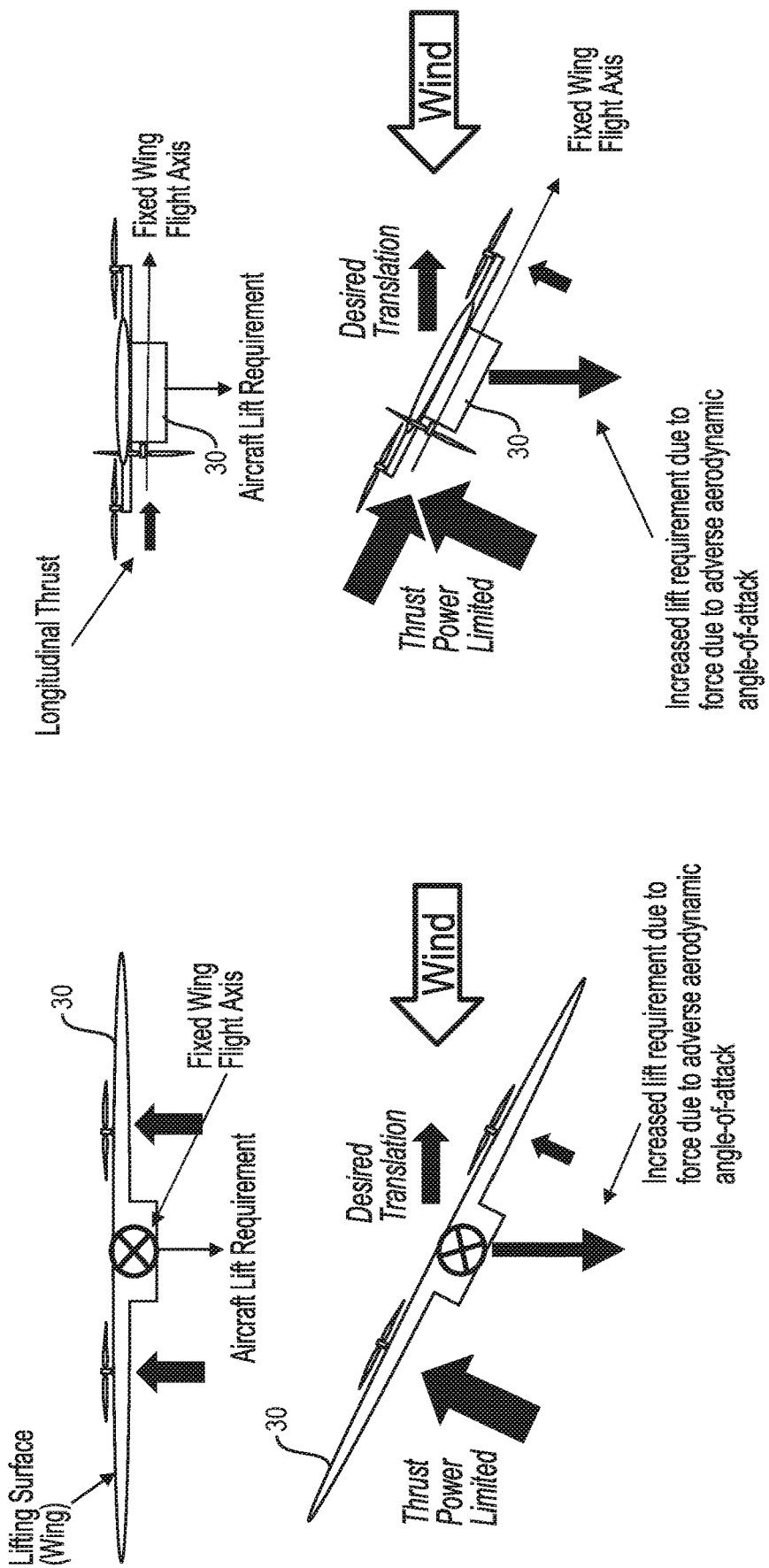
FIGS. 2A and 2B are schematic illustrations of hovering operation of the aircraft of FIG. 1.
Figure 3:
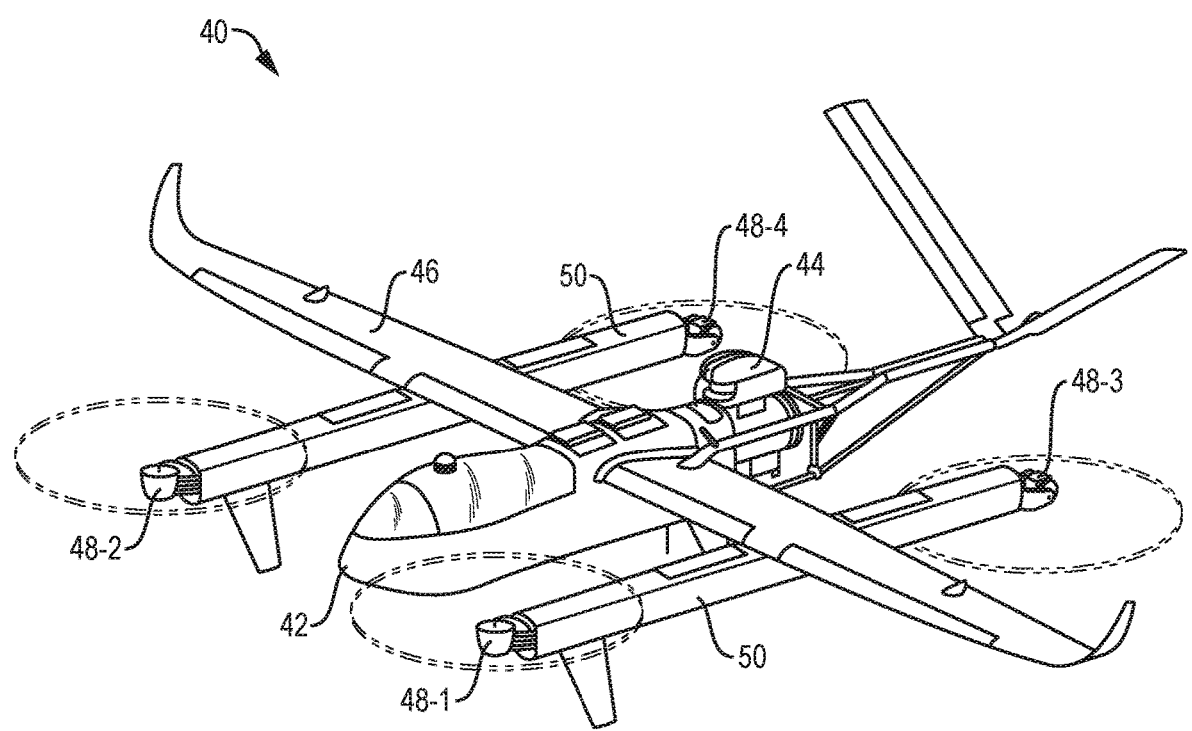
FIG. 3 is an isometric view of a VTOL aircraft in accordance with the present invention.

FIGS. 2A and 2B illustrate the problem in schematic form. FIG. 2A shows a front view of a hybrid quad aircraft 30 (which may be realized as aircraft 10 or otherwise) both in calm conditions (upper image) and windy conditions (lower image). FIG. 2B presents corresponding side views. The following are consequences of the above-discussed constraints in operation of a conventional hybrid quad 30 or similar separated lift and thrust aircraft:

Aircraft Pitch attitude must remain positive to maintain a viable angle of attach (AoA) for lifting surfaces
   a. Limits longitudinal translation to that achievable by the longitudinal thrust propulsion system which is typically designed for fixed wing efficiency
   b. Result is a limited fore/aft translation rate Aircraft roll attitude and control rates are limited to avoid presenting a cross-wind component to lifting surfaces
   a. Lateral translation rates and response are limited Aircraft yaw attitude and control rates are limited within limits of rotor rotational inertia
   a. Aircraft must weather vane into prevailing wind to avoid exceeding control authority
   b. Yaw response rate limited to that provided by differential rotational inertia
   c. Scalability of solutions are limited due to increasing moments of inertia and adverse forces arising from ambient conditions VTOL lift solutions must maintain a thrust margin to overcome negative impacts resulting from adverse fixed wing effects in hover/translation
   a. Size, weight, and power allocations to provide Sluggish maneuverability or loss of control in dynamic or challenging ambient wind conditions Difficulty tracking of fixed or moving relative position supporting dynamic recovery in mission relevant conditions As disclosed herein, a general solution to the above-described problems is to employ vectored thrust for pose and relative position control. In addition to its longitudinal-thrust engine(s), an aircraft has independently controlled tilting propulsion assemblies with one or more axes of rotation with controllable position relative to the aircraft body. Vectored thrust applied to separated lift-thrust VTOL fixed-wing aircraft can provide for the following:

Controlling fixed-wing lifting surface aerodynamic pose during VTOL and fixed wing flight;
Providing expanded lateral and longitudinal thrust; and
Active relative position control and convergence to defined static or dynamic touchdown point FIG. 3 shows an aircraft 40 according to one embodiment of the invention. The aircraft 40 has a central body or fuselage 42, rear horizontal-thrust engine 44, and laterally extending wings 46. Four motor/rotor assemblies 48 are attached at respective ends of two support booms 50, each extending longitudinally and mounted to the underside of the wings 46 as shown. The assemblies 48 are also referred to as "rotors" and "propulsion pods" or "pods" herein. In the illustrated embodiment the front rotors 48-1, 48-2 are oriented upward and the rear rotors 48-3, 48-4 downward, and at least some of the rotors 48 are articulable or variable-position (e.g., all rotors, just forward rotors, just aft rotors). In the illustrated embodiment, fore/aft pairs of rotors 48 are co-linear on lines parallel to the longitudinal axis of the aircraft 40 as shown. The opposing upward/downward rotor orientation utilizes a pusher propeller in the rear, and a tractor propeller in the front. A typical arrangement includes four rotors 48 as shown; other arrangements are possible. In some embodiments, some or all rotors 48 include a variable-pitch mechanism by which the pitch of the rotor blade is dynamically adjusted to provide another aspect of flight control.

FIGS. 4A and 4B illustrate, again in schematic form, operation of an articulated-rotor separated lift-thrust (SLT) aircraft 60 in the same conditions as those of FIGS. 2A and 2B, where the aircraft 60 may be realized as aircraft 40 (FIG. 3) or otherwise. In the lateral-translation case of FIG. 4A, the lift rotors roll to assist while managing wing attitude (substantially horizontal) to reduce adverse and variable effects of wind-induced lifting components and maintain control authority throughout VTOL operation. In the longitudinal-translation case of FIG. 4B, the lift rotors pitch to assist while managing wing attitude (again substantially horizontal) to reduce adverse and variable effects of wind-induced lifting components and maintain control authority throughout VTOL operation.

Figure 5A:
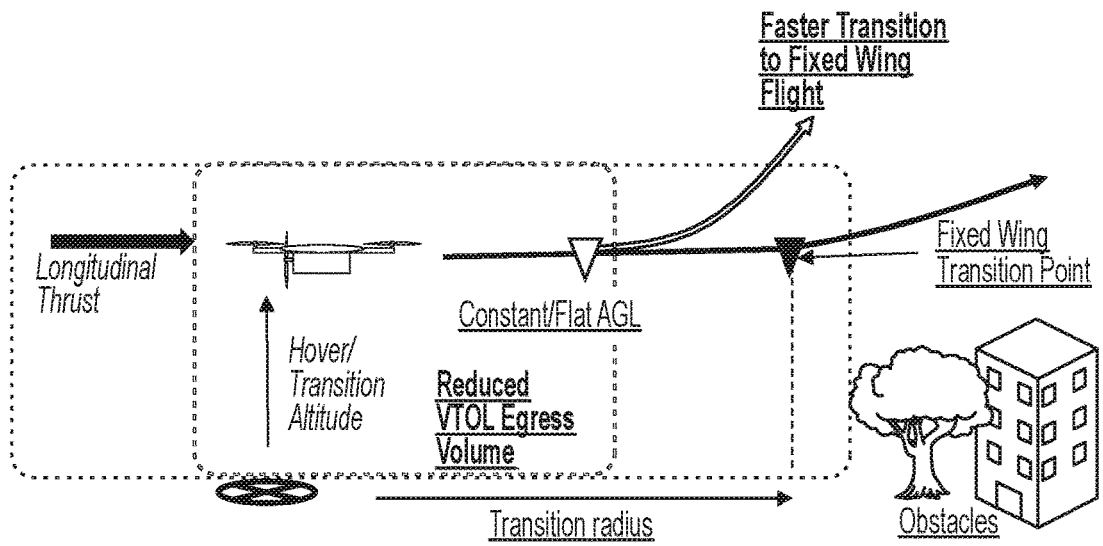
FIGS. 5A and 5B are schematic depictions of aircraft operation showing egress (takeoff) and ingress (landing) volumes.
Figure 5B:
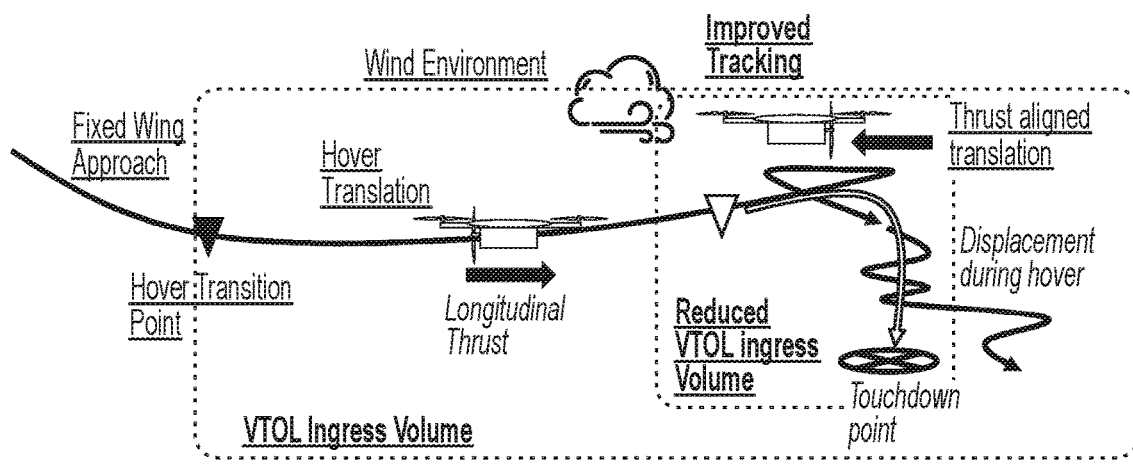

FIGS. 5A and 5B illustrate certain operational benefits that can be obtained. FIG. 5A illustrates the transition from VTOL hover to fixed-wing flight. A conventional hybrid aircraft such as aircraft 10 has a relatively large transition radius, the distance from the takeoff point to the fixed-wing transition point (far right), while an aircraft as disclosed herein may enjoy a shorter transition radius and faster/shorter transition to fixed-wing flight. The characteristics of the reverse transition (fixed-wing to hover/VTOL) are similar, as illustrated in FIG. 5B.

Figure 6:
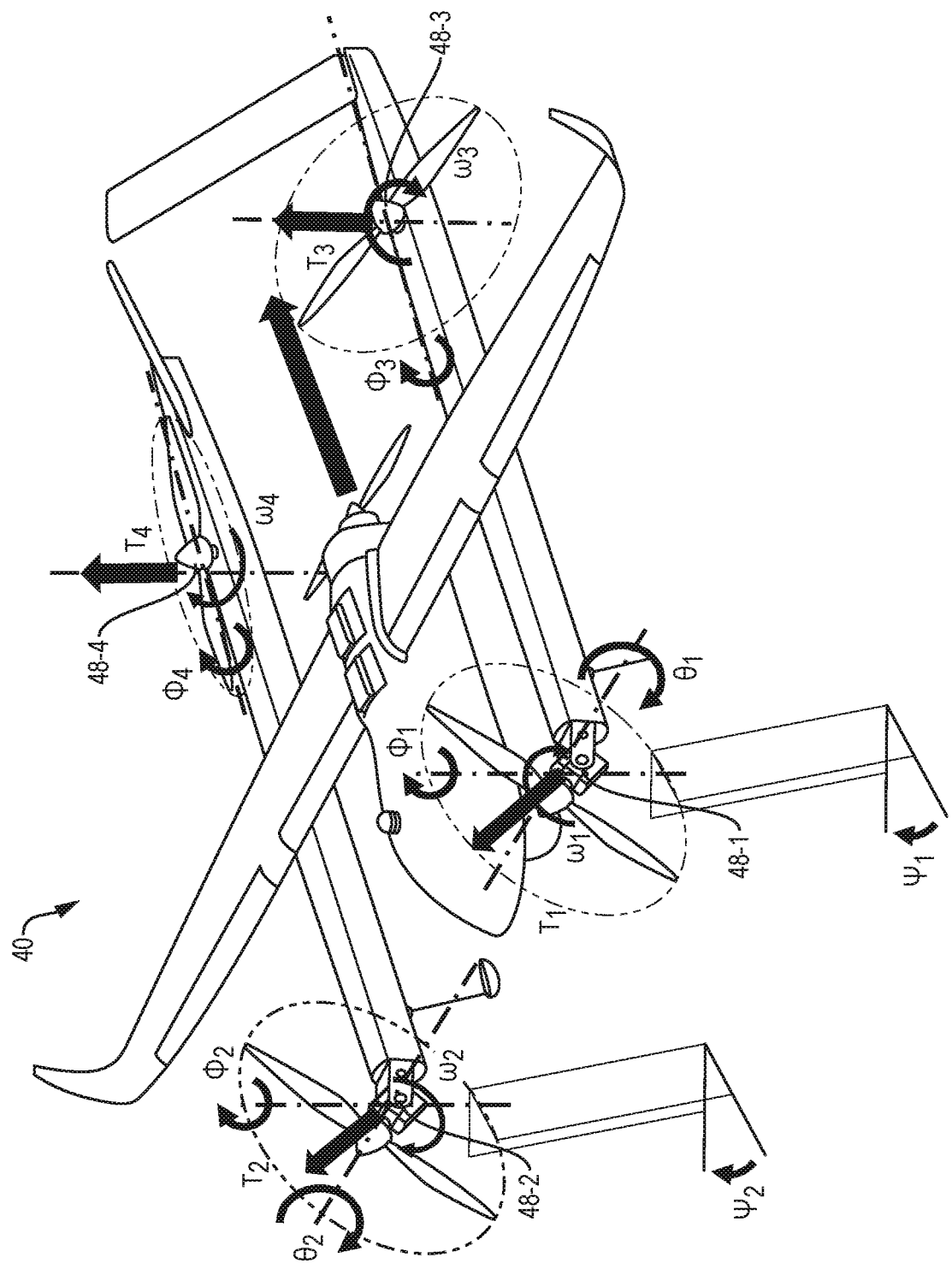
FIG. 6 is an isometric view of the aircraft illustrating thrust vectoring propulsion.

FIG. 6 illustrates the nature of thrust vectoring propulsion, with control in six dimensions—two for the longitudinal-thrust engine 44 (RPM and blade pitch) and four for the rotors 48—rotor assembly longitudinal (pitch) tilt-angle $\theta$, rotor assembly lateral (roll) tilt-angle $\Phi$, rotor RPM $\omega$, and rotor blade pitch $\psi$. T indicates resultant thrust vectors, and numeric subscripts refer to the four separate rotors 48. In general, each of the rotors 48 may be independently controlled, although as described more below there may be configurations in which some of the rotor are either fixed or are constrained relative to others. Also this diagram assumes only single-axis tilt for the rear rotors 48-3, 48-4, but as also described more below, tilt may be provided in multiple axes, providing for even greater maneuverability.

More specifically, each resultant thrust vector (T1,T2,T3, T4) may be independently controlled as a function of coordinated actuation of longitudinal pod tilt angle (pitch), lateral pod tilt angle (roll), rotor RPM, and rotor blade variable pitch angle. Each degree-of-freedom is uncoupled and managed through a central flight control processor (described more below) to achieve stable and coordinated flight through closed loop control. The ability to vary rotor tilt angle about separate axes, such as both longitudinal tilt (pitch) and lateral tilt (roll) may be referred to as compound articulation. In the embodiment of FIG. 6, the degrees of freedom of the aft vertical lift rotors (48-3, 48-4) can be expanded to include longitudinal tilt ($\Theta$) and rotor variable pitch ($\psi$). Alternate aircraft empennage/tail configurations can be conceived to expand the range of motion of these rotors through reduced or mitigated mechanical interference.

Figure 7:
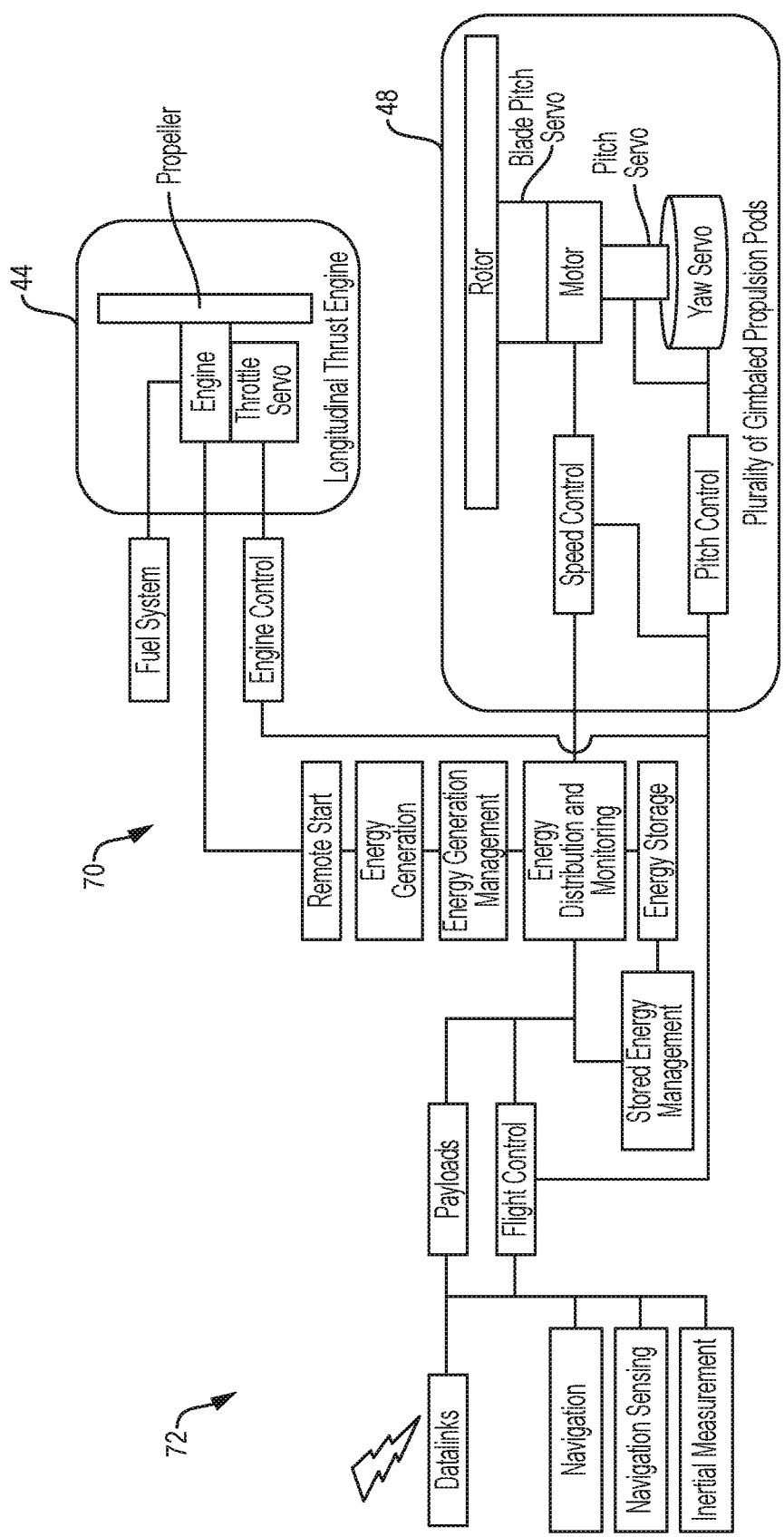
FIG. 7 is a block diagram of a flight control system.

FIG. 7 illustrates major components involved in flight control, including the following:

Energy- and power-related components 70 including energy generation (e.g., solar panels), energy storage (e.g., batteries), energy distribution and monitoring, and related management functions.

Navigation and related components 72 including datalinks for external communications, payloads, flight control, navigation, navigation sensing, and inertial measurement.

Figure 8:
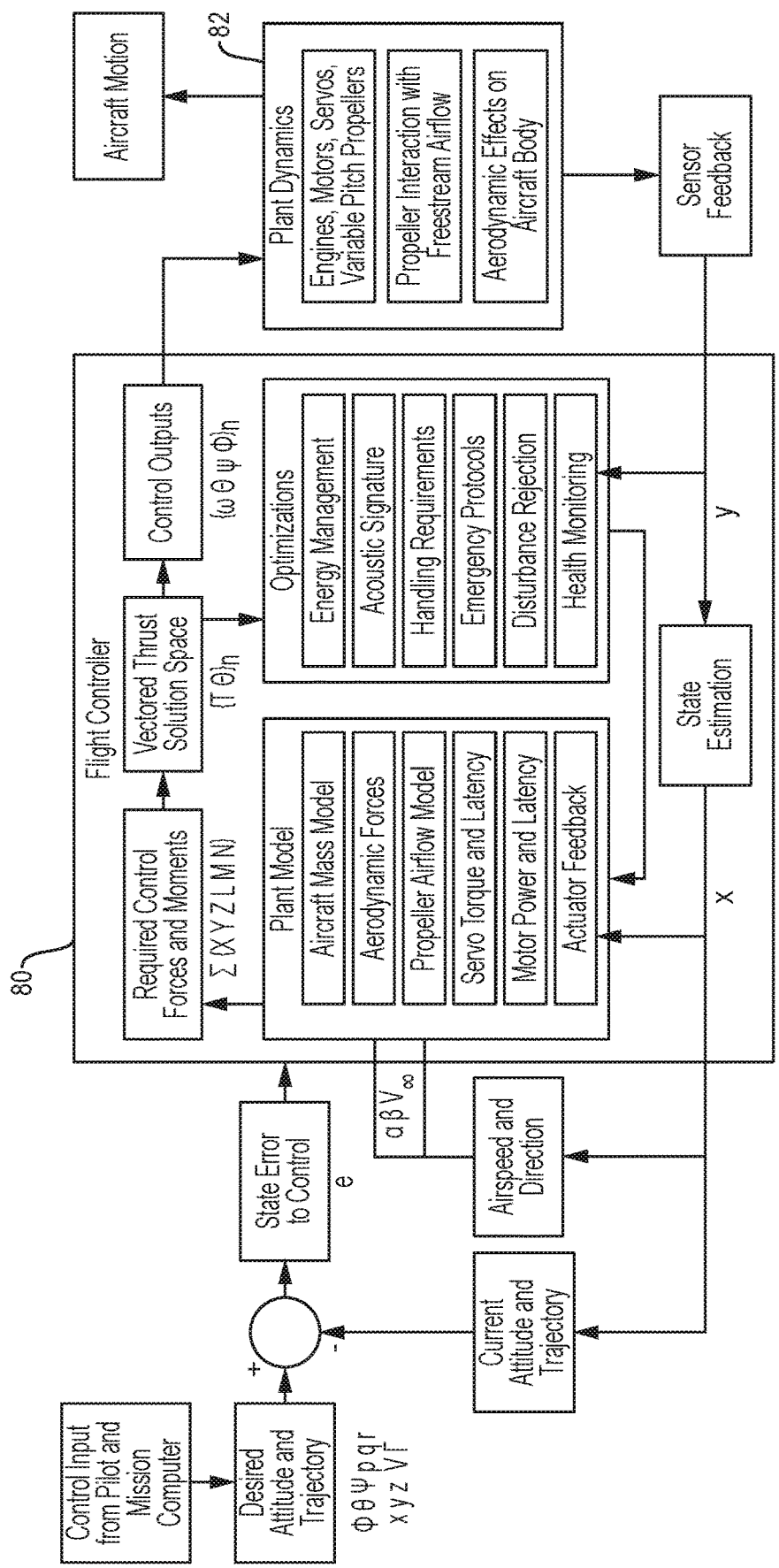
FIG. 8 is a block diagram of flight control at a detailed level.

FIG. 8 provides details of flight control as involving a computer-implemented flight controller 80 interacting with the plant dynamics 82 of the aircraft. The flight controller 80 generates control outputs including signals representing the values $\theta$, $\omega$, $\varphi$ and $\psi$ as mentioned above, which cause the physical aircraft to interact with its environment accordingly. As shown the flight controller 80 may be realized as a model-based controller incorporating a model of the aircraft physical plant for predictive control. Sensed effects are provided to the controller 80 for state estimation and estimates of altitude and trajectory as well as airspeed and direction, which estimates are provided back to the flight controller 80 along with other inputs to update the control outputs. As mentioned, the control methodology is based on vectored thrust, in contrast to other aircraft that rely on control surfaces such as flaps, etc.

Figure 9:
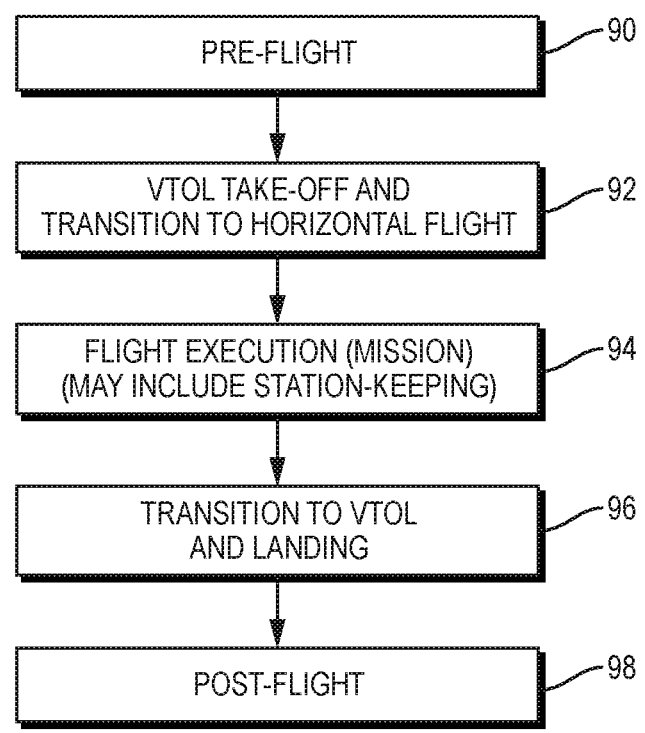
FIG. 9 is a flowchart illustration of deployment and use of the aircraft.

FIG. 9 illustrates deployment and use of the aircraft 40, which includes features of traditional fixed-wing operation along with VTOL and attendant enhanced operational flexibility. At 90 is transport and other pre-flight operations such as pre-flight maintenance and checking. Operation proceeds to vertical take-off and transition to horizontal flight 92, followed by flight execution at 94. This may be simply traditional fixed-wing flight (e.g., from one point to another), and/or may involve one or more periods of VTOL hovering referred to as "station keeping". The flight execution at 94 is followed by a transition back to VTOL operation for landing at 96. Note that the steps 92-96 may be repeated for a mission extending across a series of locations. At 98 is post-flight operation including post-flight maintenance, transport, etc.

One advantage of the aircraft 40 is its ability to generate lift in an airstream by action of the wings 46, in addition to lift from the rotors 48. The endurance of the aircraft in a station-keeping mission may be greater when deployed with winds aloft, in contrast to a conventional rotorcraft whose endurance generally decreases when deployed for station-keeping with winds aloft.

Figure 10:
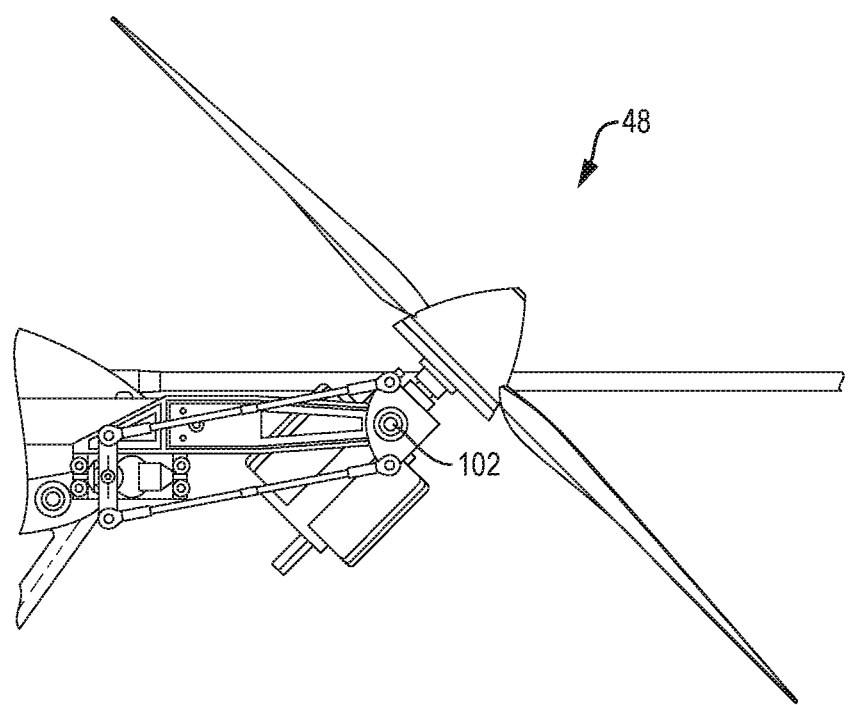
FIGS. 10-11 are illustration of rotors and their articulation.
Figure 11:
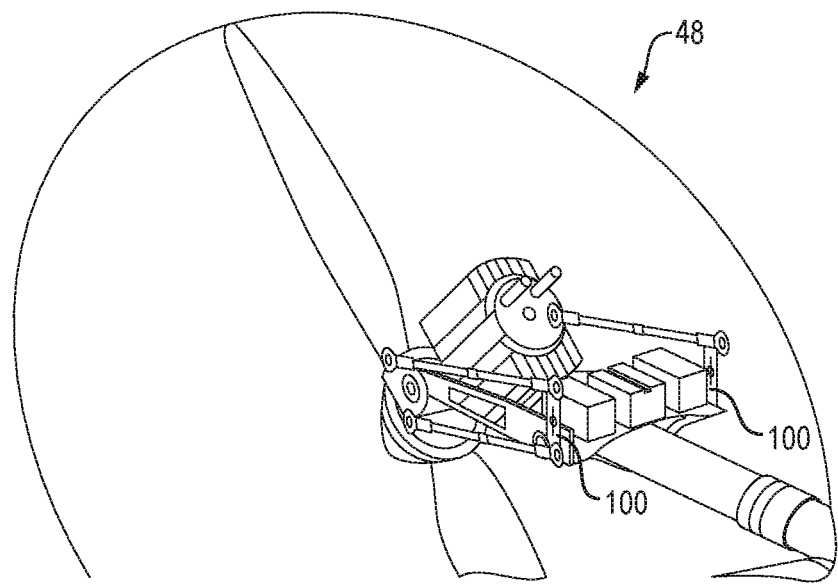

FIGS. 10-11 illustrate the rotors 48 and their articulation in additional detail. This arrangement employs parallel tandem servo control, i.e., two separate servo mechanisms 100 are arranged in parallel as best seen in FIG. 11. In this arrangement the axis of rotation 102 extends through the center of gravity of the rotor 48, as best seen in FIG. 10. Alternative mechanisms may be employed such as direct on-axis servo(s), series-tandem servos, non-center-of-gravity rotation, pneumatic or hydraulic mechanisms, belt- or gear-driven arrangements, etc. As noted above, variable positioning may be limited to one axis or may be multi-axis, e.g. tilt/yaw.

Figure 12:
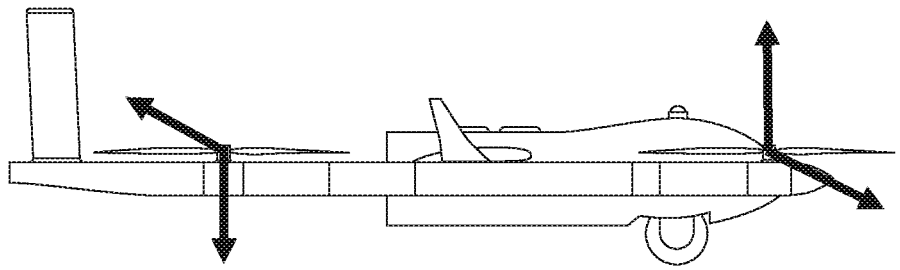
FIGS. 12-14 are side views of aircraft with different propulsion configurations.
Figure 13:
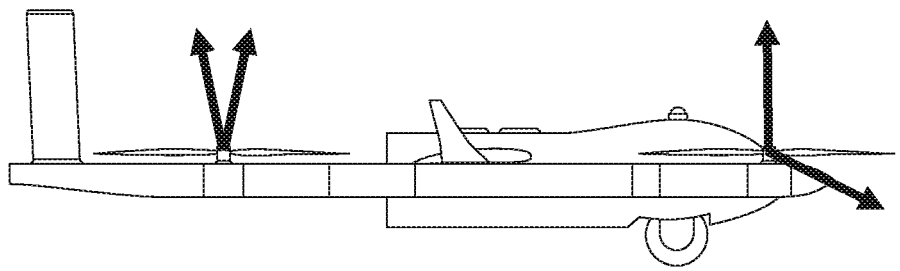
Figure 14:
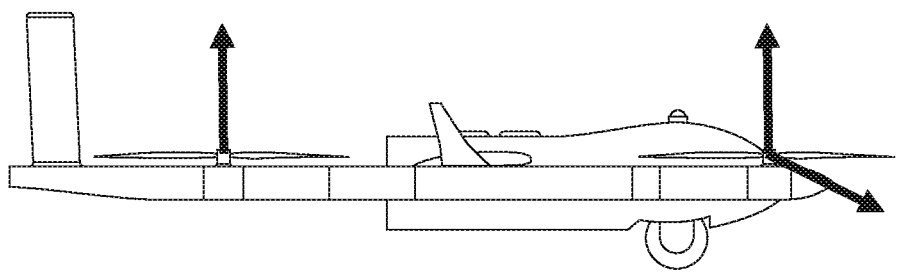

FIGS. 12-14 show examples of different propulsion configurations as briefly mentioned above. FIG. 12 is a symmetric configuration having variable position front pod (rotor) and variable position rear pod, where "position" refers to angular articulation. FIG. 13 is an asymmetric configuration having variable position front pod and semi-fixed (limited variability) position rear pod. FIG. 14 is another asymmetric configuration having variable position front pod and fixed position rear pod.

The following table describes functional details of the different configurations of FIGS. 12-14 in different phases of flight.

| Flight Phase | FIG. 12 Symmetric | FIG. 13 Constrained Set | FIG. 14 Fixed Set |
|---|---|---|---|
| VTOL/Hover | All rotors with similar range of articulation/motion | Rotors allocated to either full range of articulation or designated with limited actuation capability | Pair/set is affixed to the aircraft without articulation capability supporting VTOL in a traditional multi-rotor capacity. The remaining set/pair provides thrust vectoring capability through full range of articulation capability |
| Transition | All rotors active providing lift and transition assist. Fixed longitudinal engine provides forward thrust | All rotors active with constrained set providing lift and transition assist. Longitudinal engine providing some forward thrust. | All rotors active with fixed set/pair providing only lift assist. Longitudinal engine providing some forward thrust. |
| Fixed Wing | All rotors active. Option to stow pair/sets of rotors. Fixed longitudinal engine provides forward thrust | Constrained pair/set is disabled/stowed. Option to activate with specific maneuver assist such as aggressive climb or evasive maneuvers. | Fixed pair/set disabled/stowed. Longitudinal engine providing forward thrust. Maneuvers assisted by rotor activation. |

For the symmetric arrangement of FIG. 12, the base condition is that all propulsion pods have equivalent ranges of motion and are used during all phases of flight. However, the system can operate with just a pair/set of propulsion systems operating to provide all flight control, with the remainder operating with limited or no thrust vectoring capabilities in one or more axes—e.g., configurations such as FIGS. 13 and 14. In an embodiment with 4 rotors, this can be accomplished with either the forward pair of rotors or the rear pair of rotors. Assuming a preference for the forward pair of rotors for fixed wing flight to achieve the most efficient propeller state during cruise, the rear motors can therefore be stowed in a defined position and rendered inactive during fixed wing phases of flight yielding increased system electrical efficiency and reduced acoustic signature. The rear/aft rotors can then be reactive during fixed wing flight for greater dash speed or climb capability and to enter transition to VTOL for recovery at the conclusion of the flight. Moreover, this asymmetric control capability enables the system to employ rotor pair/set with restricted ranges of motion or with no tilting/yaw thrust vectoring capabilities to reduce weight and complexity of installed propulsion systems. For embodiments with more than 4 propulsion pods, the designation of alternative/restricted articulation capability can be applied between forward and aft propulsion systems so that a forward and rear set could have a mix of constrained/fixed propulsion pods and fully capable articulation capabilities. Selection of these alternative control modalities can be made by swapping and interchanging propulsion modules on the aircraft. In all modalities, the presence of a fixed longitudinal engine providing thrust in fixed-wing flight can augment or replace the function of the propulsion pods.

Figure 15:
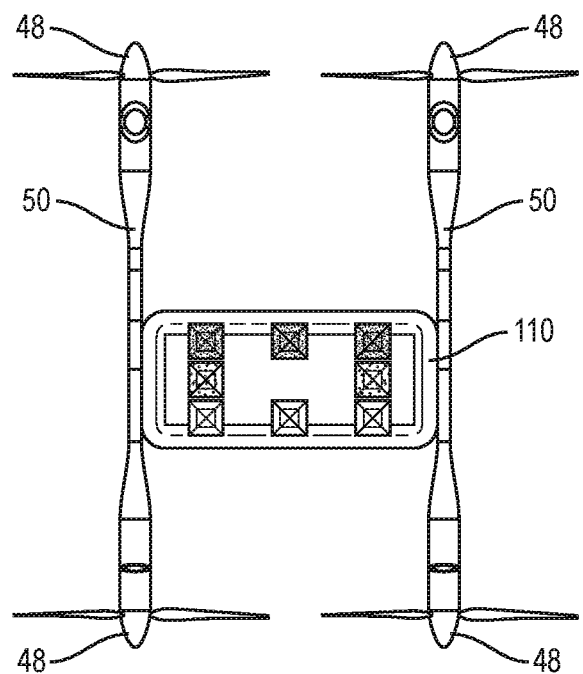
FIG. 15 is a view of an aircraft with exposed payload/battery compartment.
Figure 16:
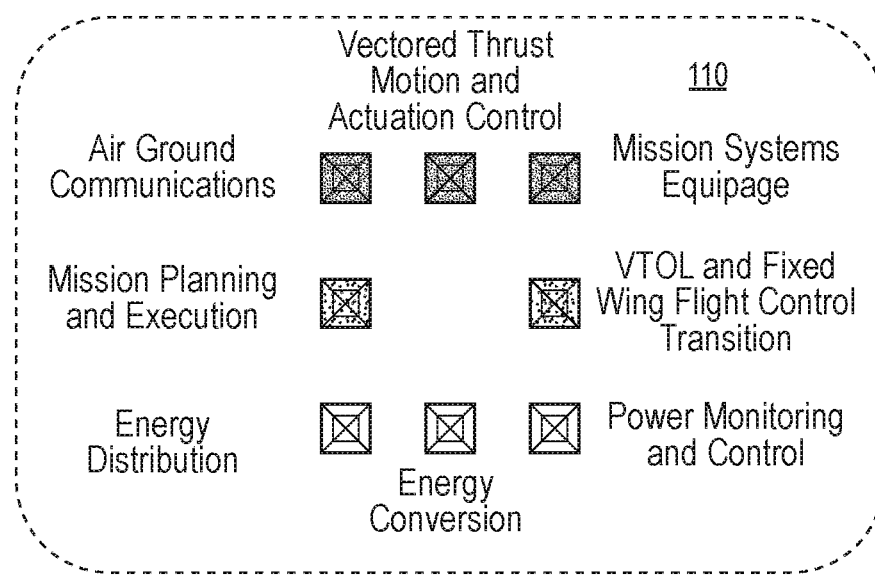
FIG. 16 is a schematic depiction of an arrangement of payload and battery sections of a payload/battery compartment.

FIGS. 15 and 16 illustrate certain modularity of system components that can enable use of the general thrust-vectoring approach on a variety of different aircraft types as described more below. The propulsion system inclusive of the rotors 48 with associated actuators and components of the vectored thrust motion and actuation control system 110 (including energy storage, energy distribution, and other components as shown) can be adapted to other airframe types, including retrofitting of existing fixed wing systems.

Figure 17:
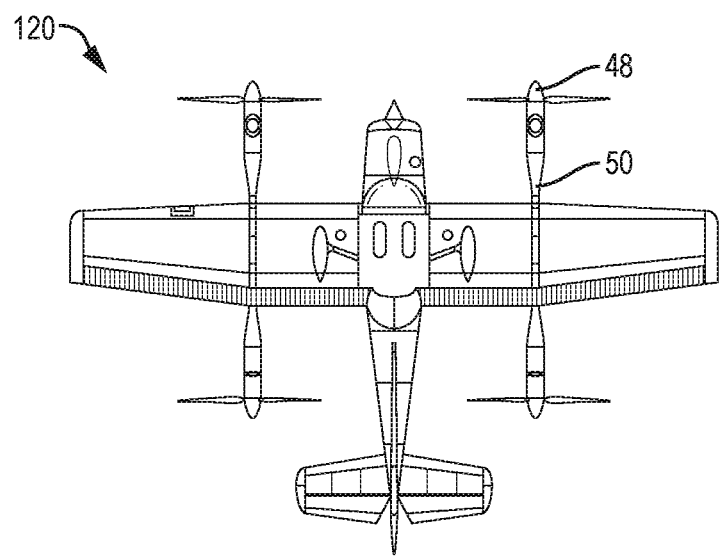
FIGS. 17-19 are top, front and side views respectively of an aircraft employing an alternative airframe type.
Figure 18:
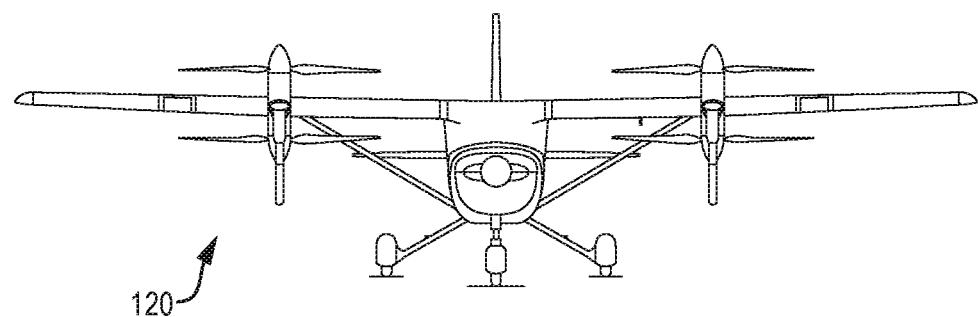
Figure 19:
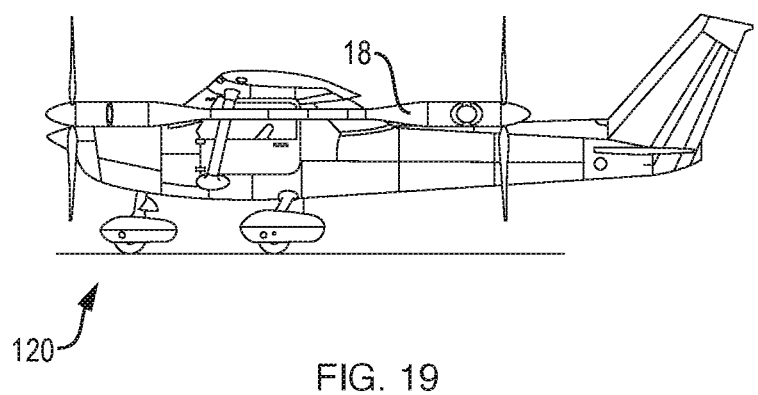
Figure 20:
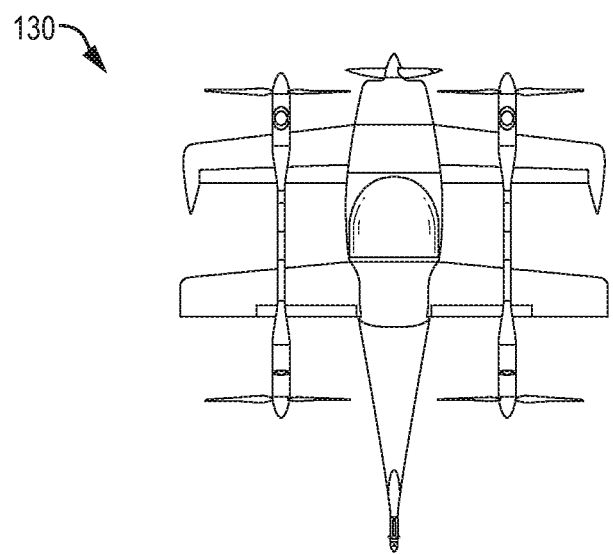
FIGS. 20-22 are top, front and side views respectively of another aircraft employing an alternative airframe type.
Figure 21:
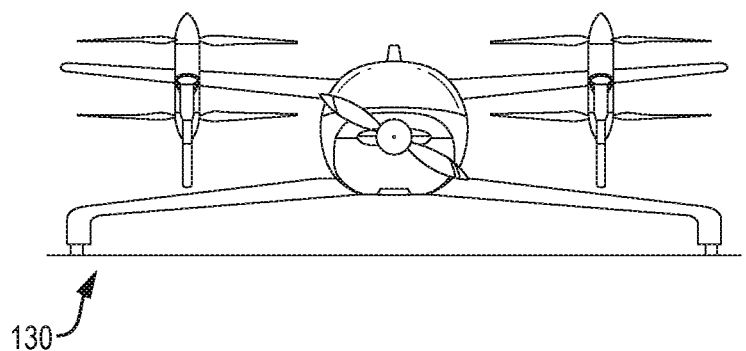
Figure 22:
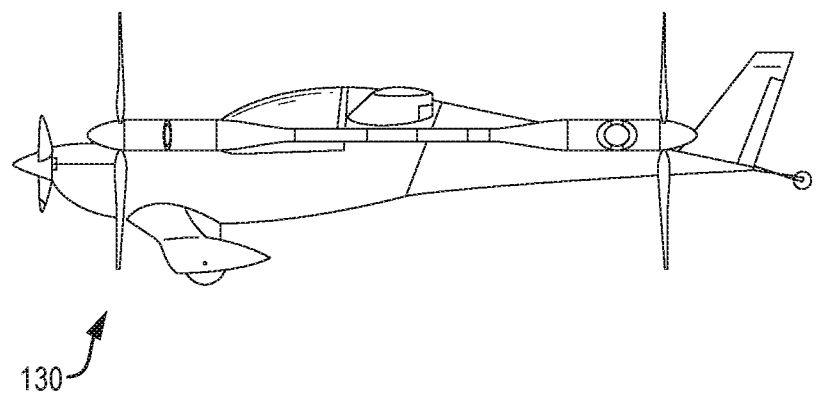

FIGS. 17-22 show examples of application to other airframe types. FIGS. 17-19 are top, front and side views of a conventional small fixed-wing airframe 120 of the type typically employing a single combustion engine, configured with rotors 48 and booms 50 attached to the undersides of the wings 46 similar to the aircraft 40 (FIG. 3). FIGS. 20-22 are top, front and side views of a second type of fixed-wing aircraft 130 similarly configured with boom-mounted rotors.

Figure 23:
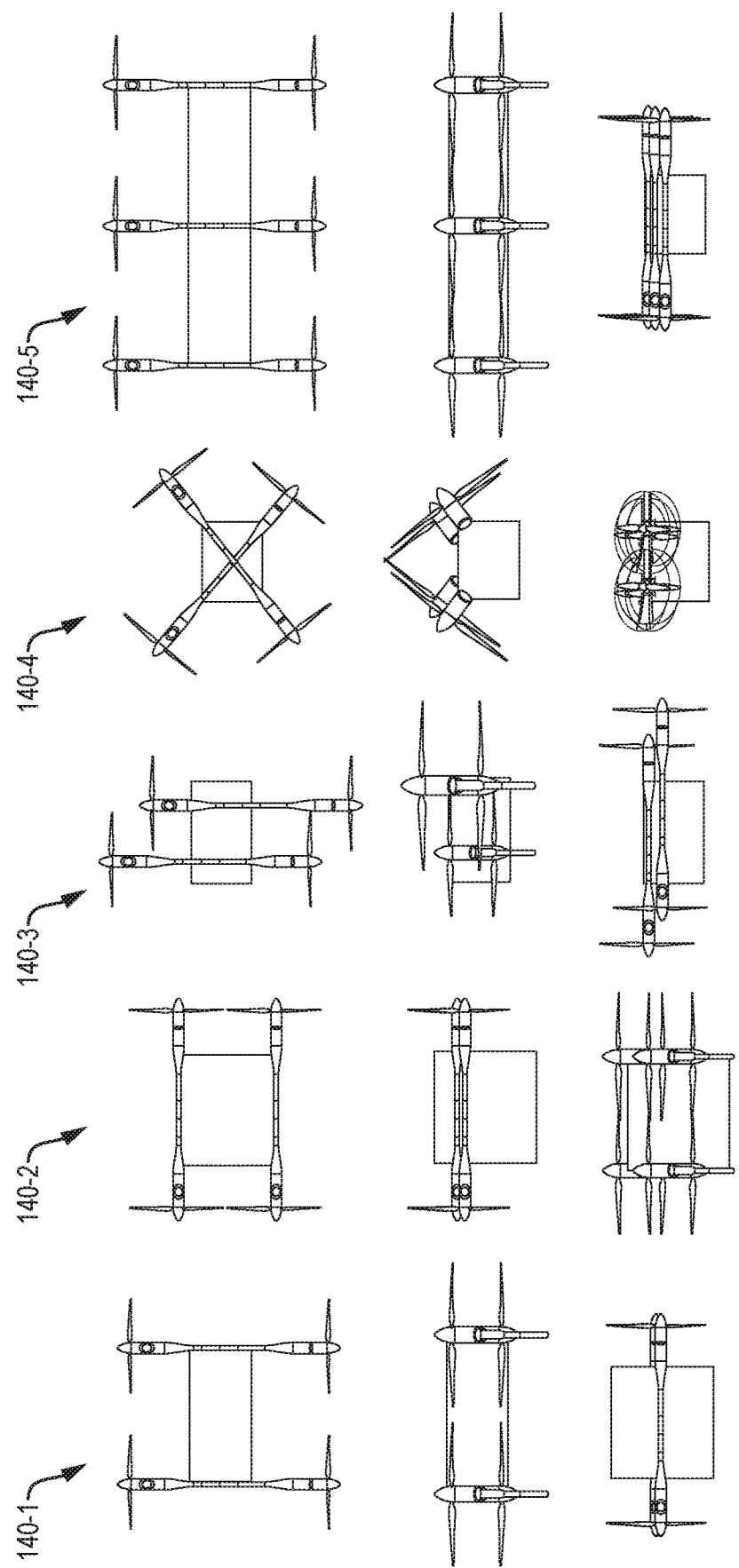
FIG. 23 is a quasi-schematic depiction of different propulsion pod geometries.

FIG. 23 is a quasi-schematic depiction of different propulsion pod geometries (configurations of boom-mounted rotors) that may be used. Five configurations 140-1 through 140-5 are shown. For each configuration 140, three views are shown: top, front and side (proceeding downward in FIG. 23). The different implementations of propulsion pod placement and attachment to the aircraft body include variations such as offsets and lateral supports.

Figure 24:
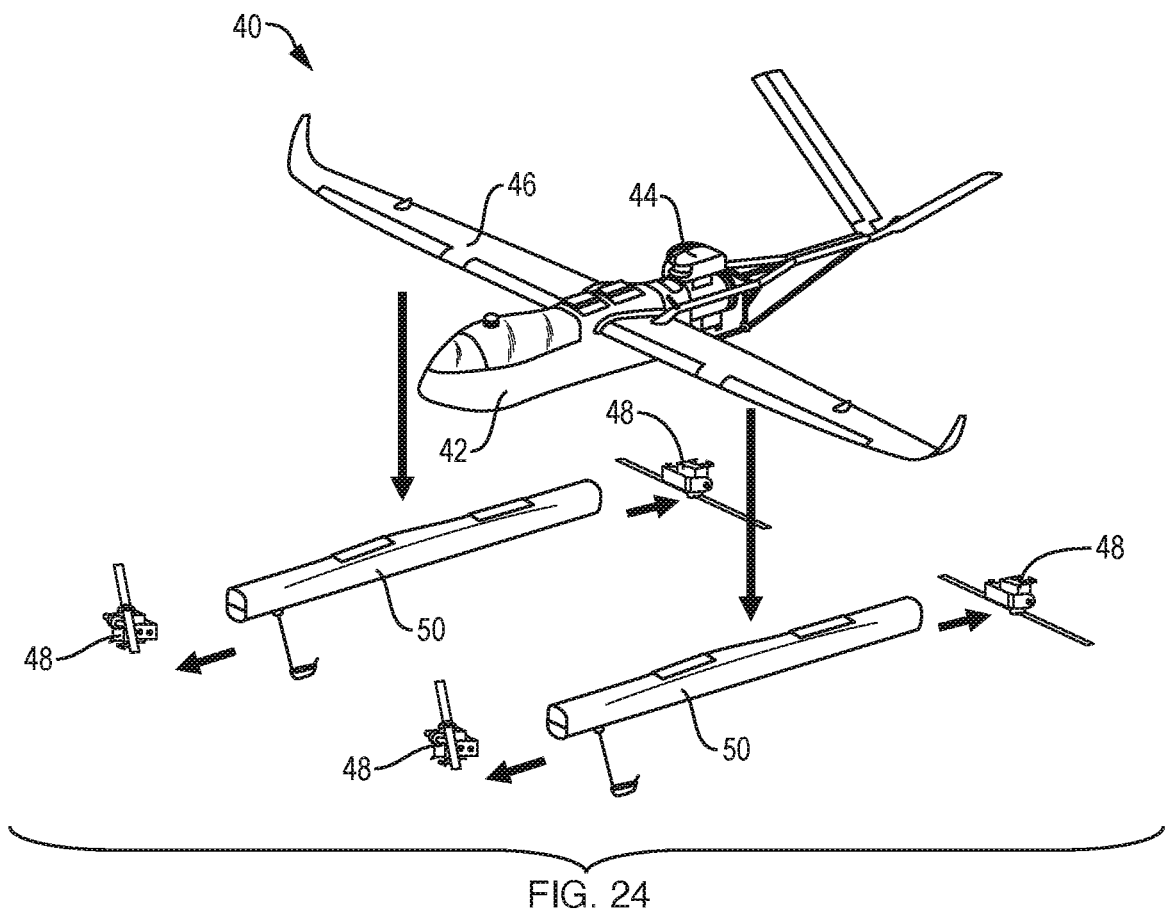
FIGS. 24-25 are diagrams illustrating modular aspects of the aircraft.
Figure 25:
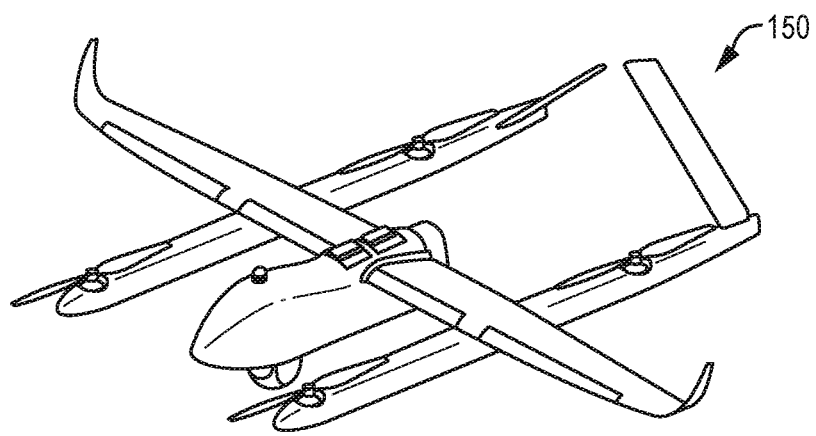

FIGS. 24-25 illustrate additional aspects of modularity that may be employed. FIG. 24 illustrates modular attachment of the booms 50 and rotors 48. FIG. 25 illustrates use of an alternative boom and tail configuration 150.

Scalability

In general, the disclosed aircraft may be scaled parametrically in both size and number of rotor assemblies. In one embodiment, an aircraft may provide for mounting of additional booms 50 and corresponding rotors 48, for example at more distal positions on the wings 46. This can provide additional lift/thrust capability.

While various embodiments of the invention have been particularly shown and described, it will be understood by those skilled in the art that various changes in form and details may be made therein without departing from the scope of the invention as defined by the appended claims.

What is claimed is:

1. An aircraft, comprising:
an airframe having a lifting surface;
a longitudinal-thrust engine;
a plurality of modular articulated electric rotors attached to the airframe, each rotor being a rotor assembly including a respective electric motor and respective propeller rotated thereby, each rotor being nominally aligned with a respective vertical axis perpendicular to a longitudinal axis of the aircraft, at least some of the rotors being variable-position rotors having variable orientations about their nominal alignment based on rotor position signals supplied thereto;
a source of electrical power for powering the electric rotors;
control circuitry configured and operative to independently control thrust of the longitudinal-thrust engine and rotor thrust and rotor orientation of each of the variable-position rotors, relative to the aircraft lifting surface and longitudinal thrust engine, to provide for commanded thrust-vectoring maneuvering of the aircraft during vertical takeoff and landing (VTOL), fixed wing flight, and intermediate transitional states, including maintenance of a desired pose of the lifting surface independent of the rotor orientations when hovering the aircraft in windy conditions; and
a flight and navigation control system that automates flight maneuvers autonomously or through human-in-the-loop augmentation and is capable of maintaining the desired aircraft system pose and position relative to static or dynamic global coordinates that are autonomously or operator defined when the aircraft is executing station keeping, tracking, avoidance, or convergence maneuvers,
wherein the variable-position rotors are compound-articulated electric rotors having variable orientations in both pitch and roll based on the rotor position, and wherein the control circuitry provides the independent control of the compound-articulated electric rotors to maintain the desired pose of the lifting surface independent of the rotor orientations when hovering the aircraft in crosswind conditions,
the aircraft being further configured and operative in both a lateral-translation case and a longitudinal-translation case, wherein in the lateral-translation case the rotors are articulated in roll to assist while managing a substantially horizontal attitude of the lifting surface to reduce adverse and variable effects of wind-induced lifting and to maintain control authority, and wherein in the longitudinal-translation case the rotors are articulated in pitch to assist while managing the substantially horizontal attitude of the lifting surface to reduce adverse and variable effects of wind-induced lifting components and maintain control authority,
wherein the control circuitry includes a model-based controller incorporating a model of assistive aerodynamic forces experienced by the aircraft including (1) in the lateral-translation case due to airflow laterally and longitudinally across the lifting surface, and (2) in the longitudinal-translation case due to airflow over the lifting surface, and the model-based controller (1) uses the model to determine response of the rotors, and (2) provides reduced energy demand and time to transition to and from fixed-wing flight in the longitudinal-translation case due to active integration of the lifting surface with a controlled transition to, and arresting from, fixed-wing flight.

2. The aircraft of claim 1, wherein the control circuitry and flight and navigation control system are co-operative to provide for thrust vectoring propulsion with control in six dimensions, including (a) rotational speed and blade pitch of the longitudinal-thrust engine, and (b) rotor assembly longitudinal tilt-angle, rotor assembly lateral tilt-angle, rotor rotational speed, and rotor blade pitch for the rotors.

3. The aircraft of claim 2, wherein each of the rotors is independently controlled.

4. The aircraft of claim 1, wherein the lifting surface is formed by wings extending laterally from a central longitudinal fuselage.

5. The aircraft of claim 4, wherein the horizontal-thrust engine is located on the fuselage and is arranged to provide rearward horizontal thrust.

6. The aircraft of claim 4, further including two elongated booms attached to the wings, and wherein the rotors are attached at respective ends of the booms.

7. The aircraft of claim 1, wherein the rotors include front rotors oriented upward and having tractor propellers, and rear rotors oriented downward and having pusher propellers.

8. The aircraft of claim 1, having a symmetric propulsion configuration including variable-orientation front rotors and variable-orientation rear rotors.

9. The aircraft of claim 1, having an asymmetric propulsion configuration including variable-orientation front rotors and constrained-orientation rear rotors, the constrained-orientation rotors having a more limited range of motion than the variable-orientation rotors.

10. The aircraft of claim 1, having an asymmetric propulsion configuration including variable-orientation front rotors and fixed-orientation rear rotors.

11. The aircraft of claim 1, wherein at least some of the rotors include a variable-pitch mechanism by which the pitch of the rotor propeller is dynamically adjusted to provide a corresponding aspect of flight control.

12. The aircraft of claim 1, wherein the model of aerodynamic forces is part of a plant model of the flight controller, the plant model also including a propeller airflow model, servo torque and latency model, motor power and latency model, and actuator feedback model.

13. The aircraft of claim 12, wherein the flight controller receives indications of airspeed and direction used in the model of aerodynamic forces and the propeller airflow model.

* * * * *